US011946627B2

(12) United States Patent
Zhou et al.

(10) Patent No.: US 11,946,627 B2
(45) Date of Patent: Apr. 2, 2024

(54) WARNING DEVICE

(71) Applicant: SIGNIFY HOLDING B.V., Eindhoven (NL)

(72) Inventors: Liang Zhou, Shanghai (CN); Liwen Zhou, Shanghai (CN); Miner Zhang, Shanghai (CN); Hai Tao Liu, Shanghai (CN)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/924,185

(22) PCT Filed: May 21, 2021

(86) PCT No.: PCT/EP2021/063636
§ 371 (c)(1),
(2) Date: Nov. 9, 2022

(87) PCT Pub. No.: WO2021/234139
PCT Pub. Date: Nov. 25, 2021

(65) Prior Publication Data

US 2023/0175677 A1 Jun. 8, 2023

(30) Foreign Application Priority Data

May 22, 2020 (WO) ................ PCT/CN2020/091808
Aug. 18, 2020 (EP) .................................... 20191426

(51) Int. Cl.
*F21V 23/04* (2006.01)
*F21V 23/00* (2015.01)
(Continued)

(52) U.S. Cl.
CPC ........ *F21V 23/0485* (2013.01); *F21V 23/008* (2013.01); *F21V 23/06* (2013.01); *F21V 25/04* (2013.01); *F21Y 2115/10* (2016.08)

(58) Field of Classification Search
CPC .... F21V 23/0485; F21V 23/008; F21V 23/06; F21V 25/04; F21V 25/02; F21Y 2115/10;
(Continued)

(56) References Cited

U.S. PATENT DOCUMENTS 4,298,919 A 11/1981 Karasawa
9,371,035 B2 6/2016 Cuddihy et al.
9,655,193 B2 5/2017 Knaapen et al.
(Continued)

FOREIGN PATENT DOCUMENTS

CN 204459865 U 7/2015
CN 206442018 U 8/2017
(Continued)

*Primary Examiner* — Peggy A Neils

(57) ABSTRACT

A warning device (100, 212, 301, 302, 510) for use in a luminaire (201, 410, 501), comprising a housing (110, 210, 310) accommodating a drive module (115, 215, 401, 402, 520) arranged to be coupled to a luminaire and to a mains voltage (260, 560). The drive module comprises a light source (120, 420) coupled to a switch (180, 380, 491, 492) and an electrical interface (140, 240) configured to electrically connect the drive module and the mains voltage to a light element (530) of the luminaire. The housing comprises a lid (130, 230, 330) operably coupled to the switch of the drive module and configured to activate the switch upon an opening of the lid for switching on the light source upon a current of the mains voltage passing in the electrical interface and deactivate the switch module upon a closing of the lid for switching off the light source.

13 Claims, 6 Drawing Sheets

(51) Int. Cl.
*F21V 23/06* (2006.01)
*F21V 25/04* (2006.01)
*F21Y 115/10* (2016.01)

(58) Field of Classification Search
CPC ..... F21Y 2105/10; H01H 3/161; H05B 47/26; H05B 47/10; H05B 45/30
See application file for complete search history.

(56) References Cited

U.S. PATENT DOCUMENTS

| | | | |
|---|---|---|---|
| 9,986,623 | B1 | 5/2018 | Miu et al. |
| 2012/0105228 | A1* | 5/2012 | Loveland ............... H05B 47/29 340/540 |
| 2015/0198321 | A1* | 7/2015 | Druchinin ............... F21V 29/56 362/294 |
| 2016/0085022 | A1 | 3/2016 | Yang et al. |
| 2016/0338166 | A1 | 11/2016 | Knaapen et al. |
| 2017/0118824 | A1 | 4/2017 | Yuh et al. |
| 2019/0037657 | A1 | 1/2019 | Lan et al. |
| 2019/0090327 | A1 | 3/2019 | Zolotykh et al. |
| 2019/0203894 | A1 | 7/2019 | Zeng et al. |

FOREIGN PATENT DOCUMENTS

| | | | |
|---|---|---|---|
| JP | H09271111 | A | 10/1997 |
| JP | 2000243483 | A | 9/2000 |
| WO | 2006056814 | A1 | 6/2006 |
| WO | 2010086758 | A1 | 8/2010 |

* cited by examiner

WARNING DEVICE

CROSS-REFERENCE TO PRIOR APPLICATIONS

This application is the U.S. National Phase application under 35 U.S.C. § 371 of International Application No. PCT/EP2021/063636, filed on May 21, 2021, which claims the benefit of International Patent Application No. PCT/CN2020/091808, filed May 22, 2020, and European Patent Application No. 20191426.4, filed on Aug. 18, 2020. These applications are hereby incorporated by reference herein.

FIELD OF THE INVENTION

The present invention relates to a warning device for use in a luminaire or luminaire arrangement.

BACKGROUND OF THE INVENTION

Luminaire lighting and arrangements of various types have attracted and continue to attract attention. Interests in luminaire lighting stems in part from their aesthetic appearance, adaptability to a large array of applications, light distribution characteristics and capacity to enable light to be emitted and directed with absence of discomfort or glare.

In particular, there is currently an interest in controlling luminaire lighting and luminaire arrangements remotely via software implemented applications in addition to standard wall interrupters or dimmers. Such software-based control of luminaire lighting permits a precise control of the light elements of said luminaires and also provides diverse lighting effects appealing to users of such devices.

However, manipulation of current luminaires and luminaire arrangements pertaining to replacement of light sources, assembly and disassembly of luminaire installations, etc. often require users to interact with electrical connections. This may generate a risk of electrical shock or discharge potentially resulting in harmful situations for the users. The occurrence of such harmful situations may further increase with software-based controlling of luminaire and luminaire arrangement as they may be turned off without interacting with the standard wall interrupters or dimmers.

Hence, it is an object of the present invention to try to overcome at least some of the deficiencies of present luminaire lighting installations regarding safety of manipulation of electrical connections of said installations.

SUMMARY OF THE INVENTION

It is of interest to overcome at least some of the deficiencies of present luminaires or luminaire arrangements, in order to improve safety of use and reduction of undesired electric shock to the users.

This and other objects are achieved by providing a warning device having the features in the independent claim. Preferred embodiments are defined in the dependent claims.

Hence, according to a first aspect of the present invention, there is provided a warning device for use in a luminaire. The warning device comprises a housing accommodating a drive module arranged to be coupled to a luminaire and to a mains voltage wherein the drive module comprises a light source coupled to a switch. The housing further accommodates an electrical interface configured to electrically connect the drive module and the mains voltage to a light element of the luminaire. The housing comprises a lid operably coupled to the switch of the drive module. The lid is configured to activate the switch of the drive module upon an opening of the lid for switching on the light source upon a current of the mains voltage passing in the electrical interface, and deactivate the switch of the drive module upon a closing of the lid for switching off the light source. Furthermore, according to a second aspect of the present invention there is provided a luminaire comprising at least one light element, a luminaire drive unit electrically coupled to the at least one light element and a warning device coupled to the luminaire unit. The warning device is further configured to emit a warning light signal indicating to a user of an electrical current in the luminaire upon an opening of the lid of the warning device. Moreover, according to a third aspect, there is provided a luminaire arrangement comprising a luminaire and a mains voltage for supplying power to at least one light element.

Thus, the present invention is based on the idea of providing a warning device for use in a luminaire alone or as part of a luminaire arrangement. The warning device is capable of emitting a warning signal via the light source(s) thereof to incite a user to turn off a power supply of the luminaire (e.g. via a wall interrupter and/or dimmer of the luminaire) and consequently ensure that potentially harmful voltage or electrical current is absent from said luminaire before moving further with its manipulation. The warning device of the present aspects is therefore based on the idea of implementing an intermediate device through which all wiring manipulation pertaining to e.g. installation/removal of the luminaire, replacement of light elements of the luminaire, etc. must be performed such that a user may, at all time, be subjected to a warning signal in case that the luminaire still involves an electrical current.

The present invention is advantageous in that the housing of the warning device may be arranged for a convenient access of a user. For example, the housing may be fixed on a wall near the luminaire or luminaire arrangement or on the luminaire or luminaire arrangement itself, such that it may be easily accessible for a user. The housing further allows for components of e.g. the drive module, electrical interface and/or lid to be amply accommodated therein without requiring cumbersome dimensions or dimensions which would affect the aesthetic aspect of the luminaire or luminaire arrangement. It will be appreciated that the electrical coupling of the drive module to the luminaire and to the mains voltage allows the luminaire or luminaire arrangement to remain functional in the events of malfunction of the drive module. It will also be appreciated that the electrical coupling defined above may be a parallel electrical coupling or a series electrical coupling. Furthermore, the switch comprised in the drive module allows electrical current to reach the light source via its activation from the lid thus resulting in the emission of the warning light signal by the light source(s) alarming the user of a potentially harmful situation. It is further envisioned that the warning signal may be represented by a different type of signal such as, but not limited to, a sound signal e.g. an alarm, or a combination of sound and light.

The present invention is further advantageous in that the lid comprised in the housing of the warning device is arranged to be attached to said housing via a first connection mechanism such as, but not limited to, a hinge. The lid may rotate about an axis of the first connection mechanism resulting in the possibility of reaching a closed position of the lid over the surface of the housing accommodating the drive module and electrical interface. The closed position of the lid is further advantageous in that it allows the deactivation of the switch coupled to the light source which will be discussed in further details in a subsequent embodiment. The arrangement or attachment of the lid with respect to the rest of the housing, e.g. via the first connection mechanism, further permits the lid to rotatably transition from the closed position to reach an open position.

The present invention is further advantageous in that the electrical interface allows for the drive module to be electrically connected to the mains voltage and further permits said mains voltage to be connected to the light element of the luminaire or luminaire arrangement. The present invention allows the lid to activate the switch when transitioning from the closed position to the open position. In turn, this permits electrical current to reach the light source in a situation for which the luminaire or luminaire arrangement remains active (e.g. the luminaire wall interrupter or dimmer is still active, the luminaire only turned off via software, etc.) In other words, if electrical current still flows through the luminaire upon opening of the lid the light source of the warning device will emit a warning light signal to the user thus providing the indication not to pursue manipulation of the electrical interface or the circuit of the drive module. It will further be appreciated that a situation in which the lid transitions to an open position and the light source does not emit a warning light signal, manipulation of the electrical interface or of the circuit of the drive module may be pursued. The present invention further allows the switch, and therefore the light source, to be deactivated upon transition of the lid to a closed position.

According to an embodiment of the present invention, the electrical interface may comprise a plurality of wire connectors, wherein at least one wire connector of the plurality of wire connectors may be configured to electrically connect the mains voltage to the drive module. The present embodiment is advantageous in that it allows several different electrical connection configurations to be implemented and allows electrical current to be supplied to the drive module thus representing the power supply of the drive module as well as the power supply of the luminaire or luminaire arrangement. The plurality of wire connectors of the electrical interface is further advantageous in that it represents an intermediate electrical connective junction between the mains voltage, the luminaire or luminaire arrangement and the drive module ensuring that manipulation of connective wiring by a user may only be performed via the warning device. The present embodiment is further advantageous in that the at least one wire connector configured to connect the mains voltage to the drive module permits the electrical connection of the load and/or neutral from the mains voltage to the drive module. It is further envisioned that the electrical connection of said load and/or neutral of the mains voltage with the luminaire or luminaire arrangement is done via the drive module. In other words, the at least one wire connector allows the electrical connection of the mains voltage with the drive module which in turns electrically connects the mains voltage to the luminaire or luminaire arrangement by means of subsequent wiring. The plurality of wire connectors comprised in the electrical interface is further advantageous in that the wire connectors permit all wiring from the mains voltage to have their connection in the housing of the warning device. Consequently, this results in the obligation of a user to move the lid into an open position prior to performing a manipulation of said wiring thus activating the switch of the drive module such that the user is warned by a warning light signal.

According to an embodiment of the present invention, at least one wire connector of the plurality of wire connectors is configured to electrically connect the mains voltage to the light element of the luminaire. The present embodiment is advantageous in that it permits the connection of the ground of the mains voltage to the luminaire or luminaire without interacting with the drive module. The above described connection of the at least one wire connector further permits avoiding cluttering the drive module and the housing with unnecessary electrical connections and additional wiring.

According to an embodiment of the present invention, the switch and the plurality of wire connectors of the electrical interface are arranged to extend through the housing. It will be appreciated that the switch and the wire connectors protrude through or are at least accessible through the surface of the housing accommodating the drive module and electrical interface. In other words, the switch and wire connectors may be seen and may be physically accessible through the surface of the housing covered by the lid in a closed position. The present embodiment is advantageous in that it allows the switch to be activated and deactivated by said lid and further allows manipulation of the wire connectors by a user when the lid is in the open position. The present embodiment is further advantageous in that it allows other components e.g. electrical circuit of drive module, light source, etc. of the drive module and electrical interface accommodated in the housing to remain protected by the surface of the housing.

According to an embodiment of the present invention, the lid in a closed position is arranged to cover the housing. In other words, in a closed position the lid is arranged to cover the entirety of the surface of the housing accommodating the drive module and the electrical interface. The present embodiment is advantageous in that it allows the lid to cover the switch and the plurality of wire connectors extending through said surface of the housing resulting in the capacity of the lid in an open position to activate the switch and to deactivate the switch in a closed position.

According to an embodiment of the present invention, the lid in the closed position may further be configured to insulate the switch and the plurality of wire connectors of the electrical interface from the surrounding environment. The present embodiment is advantageous in that the lid in a closed position fulfils a function of insulating the surface of the housing accommodating the drive module and the electrical interface. Consequently, this may result in a minimization of damages generated by e.g. temperature, hazardous environment, liquid infiltration etc. The insulation function fulfilled by the lid further results in the increase of the durability of the drive module and electrical interface of the warning device as well as protecting the user from potentially harmful electrical shocks resulting from wrongful connection at the plurality of wire connectors.

According to an embodiment of the present invention, the switch may a be spring-loaded switch comprising at least one spring element, wherein the spring-loaded switch may be configured to be deactivated upon compression of the at least one spring element and to be activated upon release of the at least one spring element. By the term “spring-loaded switch” it is here meant a pressure switch kept normally open or normally closed by means of the resilience of the at least one spring element. In other words, the spring-loaded switch may be activated upon exerting a compression force on said switch greater than the force exerted oppositely by the resilience of the spring element(s). The present embodiment is therefore advantageous in that it permits the lid to activate the spring-loaded switch by releasing its one or more spring elements when transitioning from the closed position to the open position. Analogously, the present embodiment allows for the lid to deactivate the spring-loaded switch by compressing its at least one spring element when transitioning from the open position to the closed position. The present embodiment is further advantageous in that a spring-loaded switch provides durability of it function in the drive module over a considerable number of activation/deactivation cycles.

According to an embodiment of the present invention, the switch may be a normally open switch. By the term "normally open switch" it is here meant a switch which, in a normal state, disconnects or opens an electrical circuit preventing electrical current from circulating therein. The present embodiment is therefore advantageous in that the normally open switch may be coupled in parallel to the light source of the drive module such that, in its normally open position, an electrical current may reach the light source of the drive module resulting in the indication of said electrical current to the user via a warning light signal. The present embodiment is further advantageous in that, in its closed position, the normally open switch connects or closes the parallel section of the circuit of the drive module on which it is coupled resulting in a bypass of the light source of the drive module coupled in parallel to said normally open switch. The present embodiment is therefore advantageous in that it allows the light source to be bypassed by electrical current upon compression of said normally open switch by the lid in the closed position thus preventing the light source from emitting a light signal. Analogously, the present embodiment is advantageous in that, upon transition of the lid to the open position, the normally open switch opens or disconnects the parallel section of the circuit of the drive module on which it is coupled allowing electrical current to reach the light source of the drive module, if there is an electrical current present.

According to an embodiment of the present invention, the switch may be a normally closed switch. By the term "normally closed switch" it is here meant a switch which, in a normal state, or closed state, connects or closes an electrical circuit. The present embodiment is advantageous in that the normally closed switch may be coupled in series with the light source of the drive module such that in its normally closed state an electrical current may reach the light source of the drive module resulting in the indication of said electrical current to the user via a warning light signal. The present embodiment is therefore advantageous in that it allows the switch to open or disconnect the circuit of the drive module upon compression of said normally closed switch by the lid in the closed position thus preventing the light source from emitting a light signal. Analogously, the present embodiment is advantageous in that, upon transition of the lid to the open position, the normally closed switch closes or connects the circuit of the drive module allowing electrical current to reach the light source of the drive module, if there is an electrical current present.

According to an embodiment of the present invention, the light source may comprise at least one light-emitting diode, LED. The present embodiment is advantageous in that light-emitting diodes increase the operational life of the light source, reduce its power consumption and further allow for an increased efficiency related to the ratio between light energy and heat energy. The present embodiment is further advantageous in that it allows the circuit of the drive module to remain uncluttered as such LED light sources require only minimal space.

According to an embodiment of the present invention, at least one of the housing and the lid may be made of a transparent material. The present embodiment is advantageous in that it allows the warning light signal emitted from the light source to be perceived by the user through the transparent housing and/or through the transparent lid.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1B:
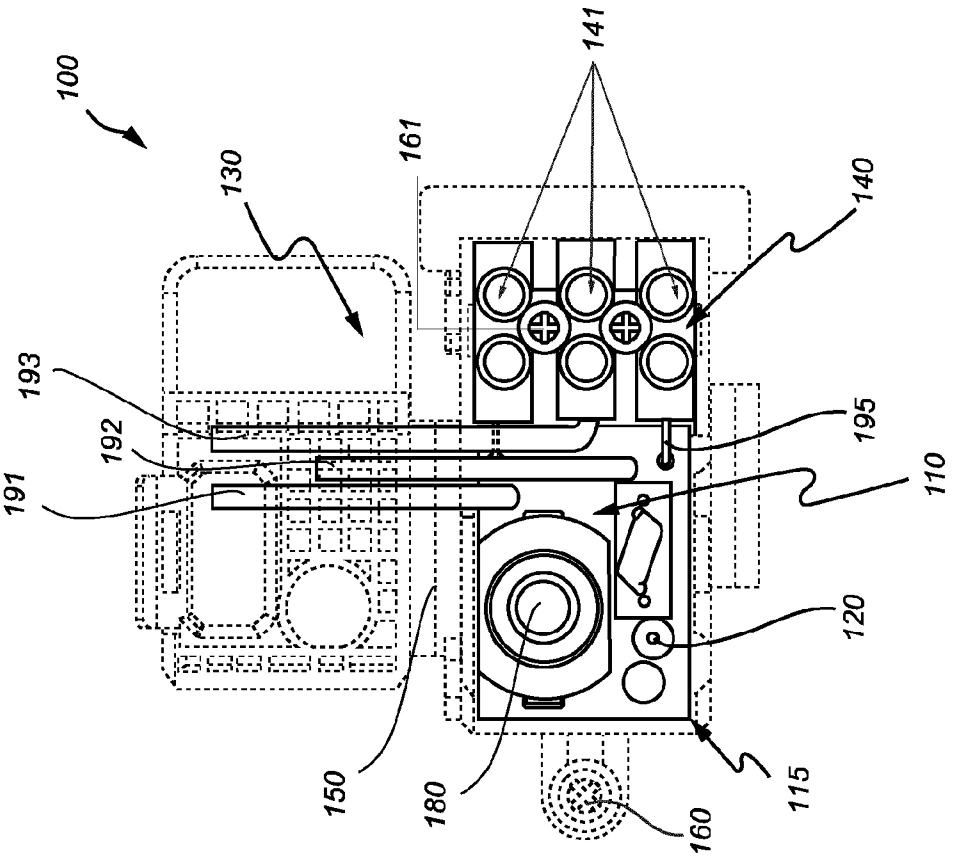
FIGS. 1*a* and 1*b* schematically illustrate top views of a warning device according to an exemplifying embodiment of the present invention, FIG. 2 schematically illustrates a luminaire arrangement according to an exemplifying embodiment of the present invention, FIGS. 3*a* and 3*b* schematically illustrate a perspective view of a warning device having a lid in a closed position and a side view of a warning device having a lid in an open position according to examples of the present invention, FIGS. 4*a* and 4*b* schematically illustrate alternative representations of the electrical circuit of a drive module of the warning device implementing a normally closed switch and a normally opened switch according to exemplifying embodiments of the present invention, FIG. 5 schematically illustrates a block diagram representing the electrical configuration of a luminaire or luminaire arrangement according to examples of the present invention, and FIG. 6 schematically illustrates a block diagram of the utilization process of the warning device by a user according to examples of the present invention.
Figure 1A:
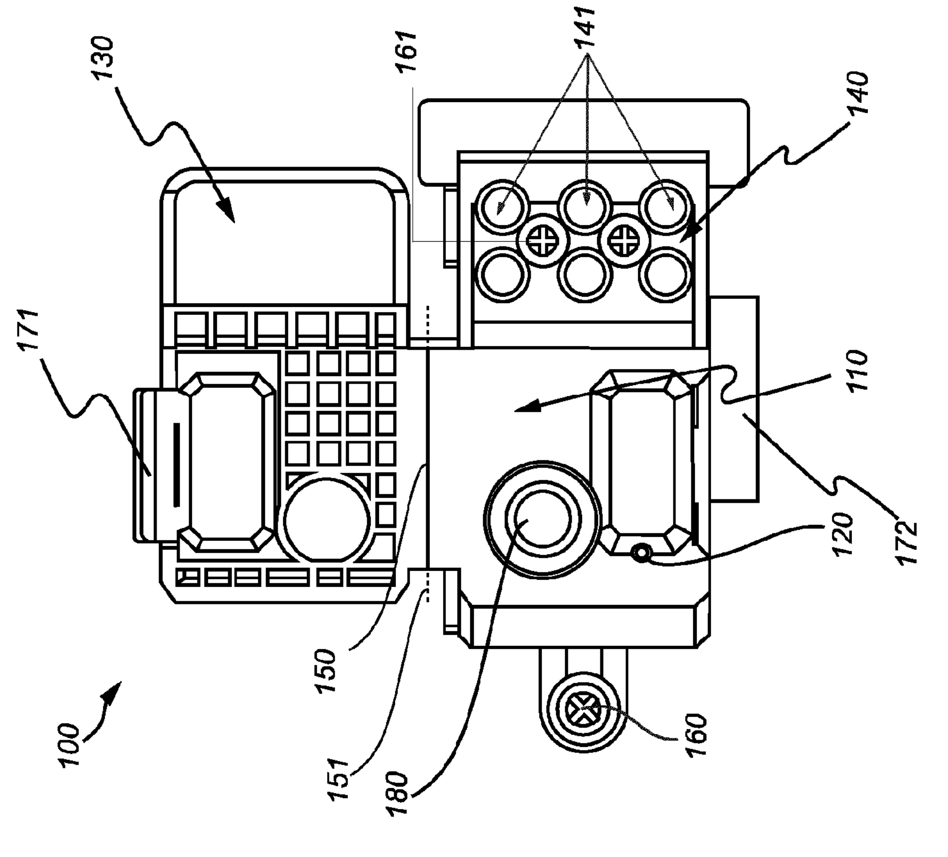

FIG. 1*a* schematically shows a top view of a warning device 100 according to embodiments of the present invention. A housing 110 of the warning device 100 is fixedly attached to e.g. a wall near the luminaire or luminaire arrangement or on the luminaire or luminaire arrangement itself, such that the housing 110 is easily accessible for a user, e.g. by means of a bolt or screw 160. The housing 110 shown in FIG. 1*a* is arranged to accommodate a drive module (visible in its entirety in FIG. 1*b*) to be electrically coupled to a luminaire or luminaire arrangement (not shown) and to a mains voltage (not shown). The drive module comprises an electrical circuit on which are coupled a light source 120 and a switch 180. Although shown as opaque in FIG. 1*a*, the housing 110 may be formed of a transparent material permitting the light source 120 to be seen through the material of the housing 110 by a user. The switch 180 is further shown covered by an electrically non-conductive protective liner, preferably plastic or rubber, which provides protection of the switch 180 and increases the safety of the user in the events of malfunction of the drive module. The housing 110 of FIG. 1*a* is further shown accommodating an electrical interface 140 comprising a plurality of wire connectors 141 fixedly attached to said housing 110 by means of bolt or screws 161. FIG. 1*a* further shows the switch 180 and the plurality of wire connectors 141 protruding through or being accessible through the superior surface of said housing 110 accommodating the drive module and the electrical interface 140. This configuration of the housing 110 and its accommodated components permits the user to physically access the plurality of wire connectors 141 and the switch 180 when the lid 130 is in an opened position as shown in FIG. 1*a*. Furthermore, the lid 130, shown in FIG. 1*a* in the opened position, is rotatably attached to the rest of the housing 110 by means of a first connection mechanism 150. The connection mechanism 150 is exemplified as a pre-folded axis 151 in the material of the lid 130. The lid 130 is therefore arranged to rotate about the axis 151 to transition from an opened position to a closed position and vice versa. Additionally, FIG. 1*a* depicts the dimensions of the lid 130 as equivalent to the dimensions of the superior surface of the housing 110 accommodating the drive module and electrical interface 140 such that in a closed position (shown in more detail in FIG. 3*a*) the lid 130 covers and insulates the entirety of the superior surface of the housing 110. FIG. 1*a* further illustrate a second connection mechanism 171, 172 represented by a quick release attachment integrally formed in the material of the housing 110 and the lid 130. The female end of the second connection mechanism 171 is shown positioned at the edge of the lid 130 opposite the pre-folded axis 151 of the first connection mechanism 150 and is arranged to be engaged by the male end 172 positioned at the edge of the superior surface of the housing 110 opposite the pre-folded axis 151 of the first connection mechanism 150.

FIG. 1*b* illustrates a top view of the warning device 100 shown in FIG. 1*a*, and it should be noted that it may be referred to the warning device 100 in FIG. 1*a* for features, functions, references, etc., of the warning device 100. In FIG. 1*b* only the silhouette of the housing 110 and the lid 130 is shown such that the components accommodated in said housing 110 and extending out of said housing 110 under the lid 130 are clearly depicted. FIG. 1*b* shows the drive module 115 as comprising a circuit board onto which the switch 180 and the light source 120 are coupled. The drive module 115 is further shown comprising additional electrical components normally found in such implemented circuits such as, but not limited to, capacitors, diodes, resistors, etc. FIG. 1*b* further illustrate the entirety of the electrical interface 140 and its plurality of wire connectors 141 through which the drive module 115, the light element of the luminaire or luminaire arrangement (not shown) and the mains voltage (not shown) connectively interact. FIG. 1*b* further illustrates an electrical wire 195 configured to establish an electrical connection between at least one wire connector 141 and the drive module 115 and illustrates an electrical wire 193 configured to establish an electrical connection between at least one wire connector 141 and the luminaire or luminaire arrangement itself. FIG. 1*b* further shows electrical wires 191 and 192 configured to establish an electrical connection between the drive module 115 and the luminaire or luminaire arrangement. It will be appreciated that the electrical wires 191, 192 and 195 are fixedly connected to the drive module 115 by means of soldering whereas the electrical wires 193 and 195 are connected to the wire connectors 141 by means of a screw.

Figure 2:
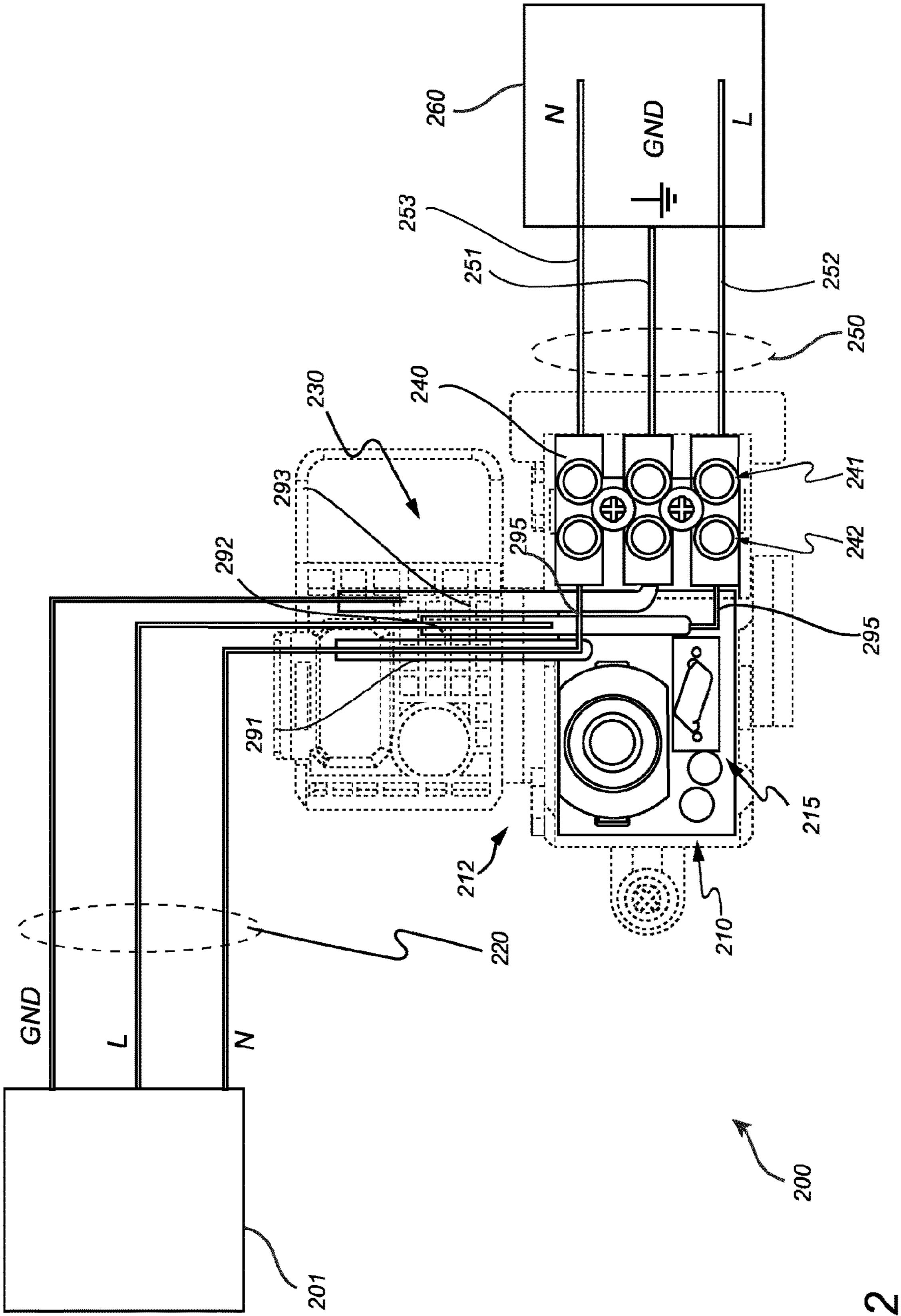

FIG. 2 schematically illustrates a luminaire arrangement 200 according to an exemplifying embodiment of the present invention. FIG. 2 shows a luminaire 201 and a mains voltage 260 electrically coupled together and via the drive module 215 accommodated in the housing 210 of a warning device 212. FIG. 2 illustrates the mains voltage 260 comprising electrical wiring 250 formed of a ground 251, a load 252 and a neutral 253. The electrical wiring 250 of the mains voltage 260 is shown in FIG. 2 connected to respective input ports 241 i.e. the plurality of wire connectors of the electrical interface 240. The input ports 241 of the electrical interface 240 are further shown establishing an electrical connection with the output ports 242 of the electrical interface 240 from which the load 252 and the neutral 253 of the mains voltage 260 are electrically coupled to the drive module 215 by means of the electrical wiring 295 allowing the drive module 215 to be supplied by electrical current from the mains voltage 260. FIG. 2 further depicts the ground 251 of the mains voltages 260 being electrically coupled to the luminaire 201 directly from the output port 242 of the electrical interface 240 without interacting with the drive module 215. The drive module 215 is further electrically coupled to the luminaire 201 by means of the electrical wiring 220 which permits the establishment of an electrical connection of the load 252 of the mains voltage 260 and the neutral 253 of the mains voltage 260 with the luminaire 201. The electrical wiring 220 connecting the drive module 215 and the mains voltage 260 to the luminaire 201 is further shown in FIG. 2 as exiting the housing of the warning device 212 under the lid 230 in an opened position and are further shown covered by electrically non-conductive protective sleeves 291, 292, 293. The electrical connection configuration shown in FIG. 2 provides a warning device 212 connected in parallel between the mains voltage 260 and the luminaire 201 and will be described in more details in FIG. 4. It is also envisioned that the warning device 212 may be connected in series with the mains voltage 260 and the luminaire 201 and/or that the ground 251, the load 252 and the neutral 253 of the mains voltage 260 be electrically connected to a drive unit of the luminaire 201 which will also be further described in FIG. 4.

Figure 3B:
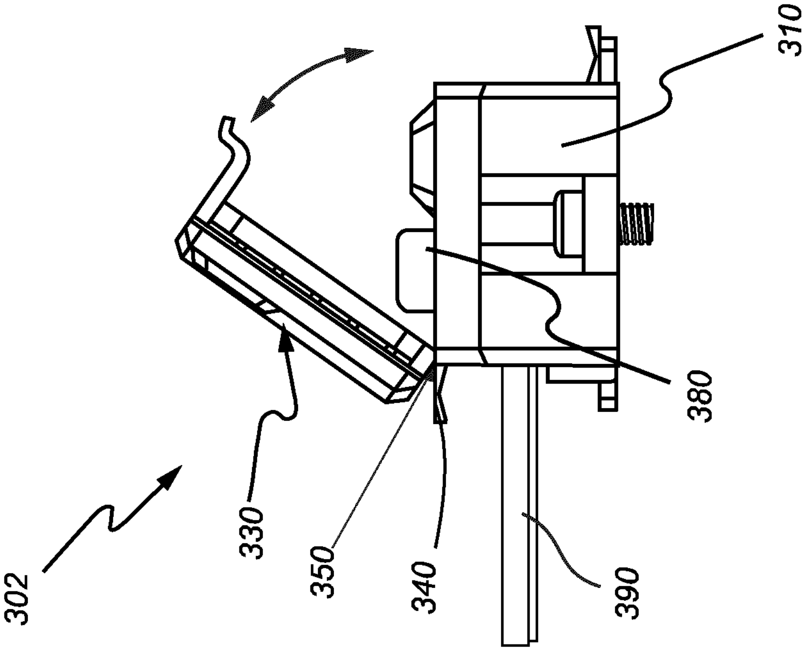
Figure 3A:
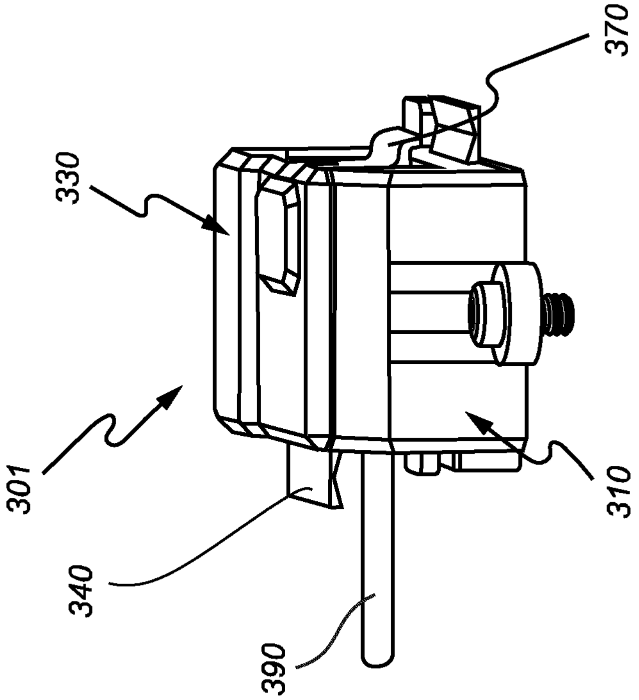

FIGS. 3*a* and 3*b* schematically illustrate a perspective and side view of warning device having a lid in a closed position 301 and in an opened position 302 according to examples of the present invention. FIG. 3*a* shows a warning device 301 comprising a housing 310 accommodating the drive module and the electrical interface as described in FIGS. 1-2 with a lid 330 shown in a closed position. FIG. 3*a* further shows the lid 330 covering the entirety of the surface of the housing 310 through which the switch of the drive module and the plurality of wire connectors of the electrical interface protrude providing insulation of such components. The insulation function of the lid 330 is further permitted by a second connection mechanism 370 shown engaged in FIG. 3*a* which also illustrates the electrical wiring 390, covered in protective sleeves, exiting the back side of the housing 110 to electrically connect the drive module and the mains voltage to the luminaire or luminaire arrangement. Additionally, the lid 330 shown in FIG. 3*a* in the closed position exerts a compression force on the switch protruding through the housing 310 deactivating said switch and therefore turning off the light source of the drive module. The warning device 301 further comprises a stopping element 340 integrally formed with the rest of the housing 310.

FIG. 3*b* illustrates the warning device 302 having a lid 330 in an open position. FIG. 3*b* shows the lid 330 of the warning device 302 having transitioned from the closed position to the opened position through rotation of the lid 330 about the axis of the first connection mechanism 350 i.e. pre-folded axis in the material of the lid 330. The rotation of the lid 330 upon its edge is further shown limited by a stopping element 340 integrally formed with the rest of the housing 310 only allowing the rotation of the lid 330 to reach 90°. It is further envisioned that the housing 310 may also be designed without such stopping element 340 allowing the lid 330 to rotate to 180° while still not contacting the electrical wiring 390. FIG. 3*b* therefore illustrates the lid 330 releasing the switch 380 thus activating said switch 380 and allowing the light source of the drive module to be reachable by electrical current supplied by the mains voltage and to subject the user to a warning light signal upon said current flowing through the electrical interface and into the drive module.

Figure 4B:
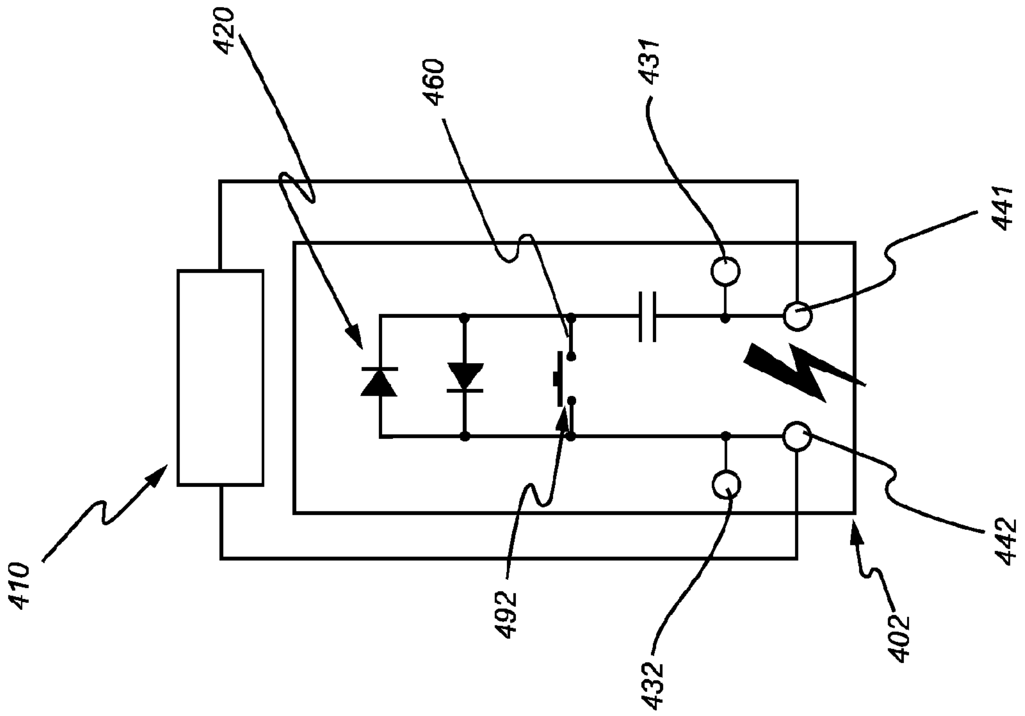
Figure 4A:
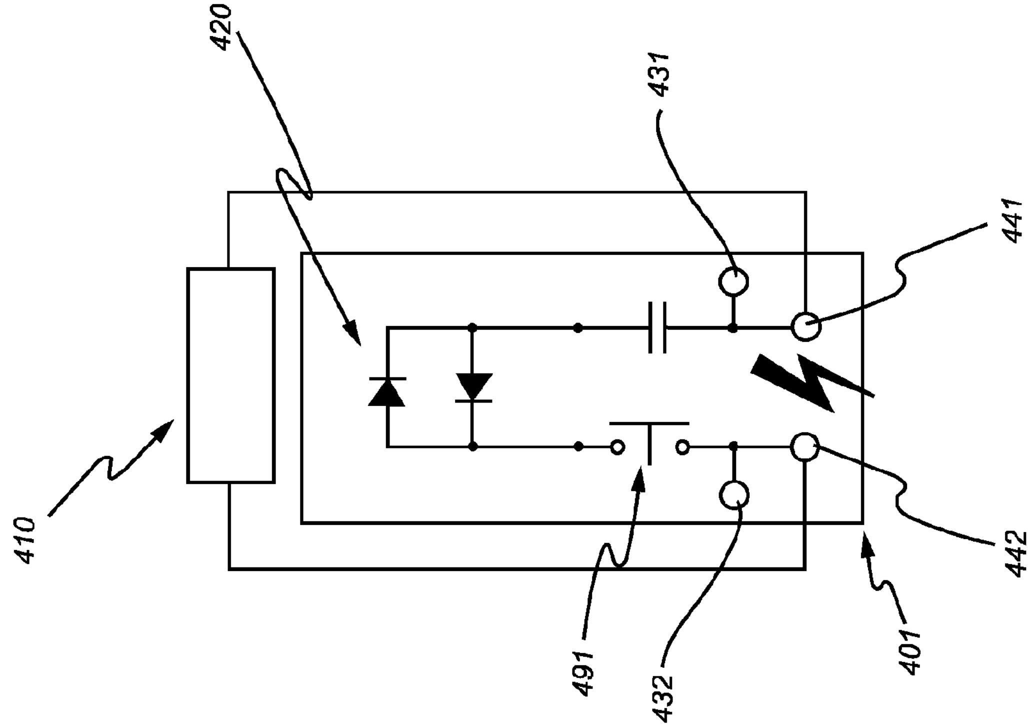

FIGS. 4*a* and 4*b* schematically illustrate alternative representations of the electrical circuit of the drive module of the warning device implementing a normally closed switch and a normally opened switch according to exemplifying embodiments of the present invention. FIG. 4*a* shows an alternative of an electrical circuit of the drive module 401 and its electrical connection configuration with the luminaire 410. The circuit of the drive module 401 is shown electrically connected to the load 431 and to the neutral 432 of the mains voltage and further establishing an electrical connection of the load 431 and neutral 432 of the mains voltage with the luminaire 410, e.g. through outputs 442, 441. FIG. 4*a* further illustrates a switch 491 coupled in series with a LED light source 420 in which the switch 491 is a normally closed switch. By this, the circuit of the drive module 401 is disconnected or opened when the switch 491 is deactivated i.e. when the lid of the warning device (not shown) exerts a compression force on the switch 491 when reaching a closed position. In other words, when the switch 491 is compressed, no electrical current passes through the circuit of the drive module 401. Upon transition of the lid of the warning device from a closed position to an opened position, the normally closed switch 491 shown in FIG. 4*a* returns to its normally closed position. Consequently, the switch connects the circuit of the drive module 401 thus allowing the light source 420 coupled in series thereafter to be reachable by electrical current supplied by the mains voltage and to subject the user to a warning light signal upon said current flowing through the electrical interface and into the drive module.

FIG. 4*b* shows yet another alternative of an electrical circuit of the drive module 402 and its electrical connection configuration with the luminaire 410. Similarly to FIG. 4*a*, the electrical connection between the mains voltage and the circuit of the drive module 402 is established via the input ports 431, 432 and its electrical connection with the luminaire 410 is established via output ports 441, 442. Alternatively to FIG. 4*a*, the electrical circuit of the drive module 402 shown in FIG. 4*b* comprises a switch 492 coupled in parallel to the LED light source 420 in which the switch 492 is a normally open switch therefore connecting or closing the circuit of the drive module 402 when the switch 492 is deactivated i.e. when the lid of the warning device (not shown) exerts a compression force on the switch 492 when reaching a closed position. The parallel configuration of the normally opened switch 492 with respect to the light source 420 shown in FIG. 4*a* allows electrical current to bypass said light switch 420 when the normally opened switch 492 is compressed and closes the section 460 of the circuit 402 on which it is arranged. In other words, when the switch 492 is compressed by the lid of the warning device, no electrical current reaches the light source 420. Upon transition of the lid of the warning device from a closed position to an opened position, the normally opened switch 492 shown in FIG. 4*b* returns to its normally opened position and disconnects the section 460 of the circuit on which it is arranged thus allowing the light source 420 coupled in parallel to said section 460 to be reachable by electrical current supplied by the mains voltage and to subject the user to a warning light signal upon said current flowing through the electrical interface and into the drive module.

Figure 5:
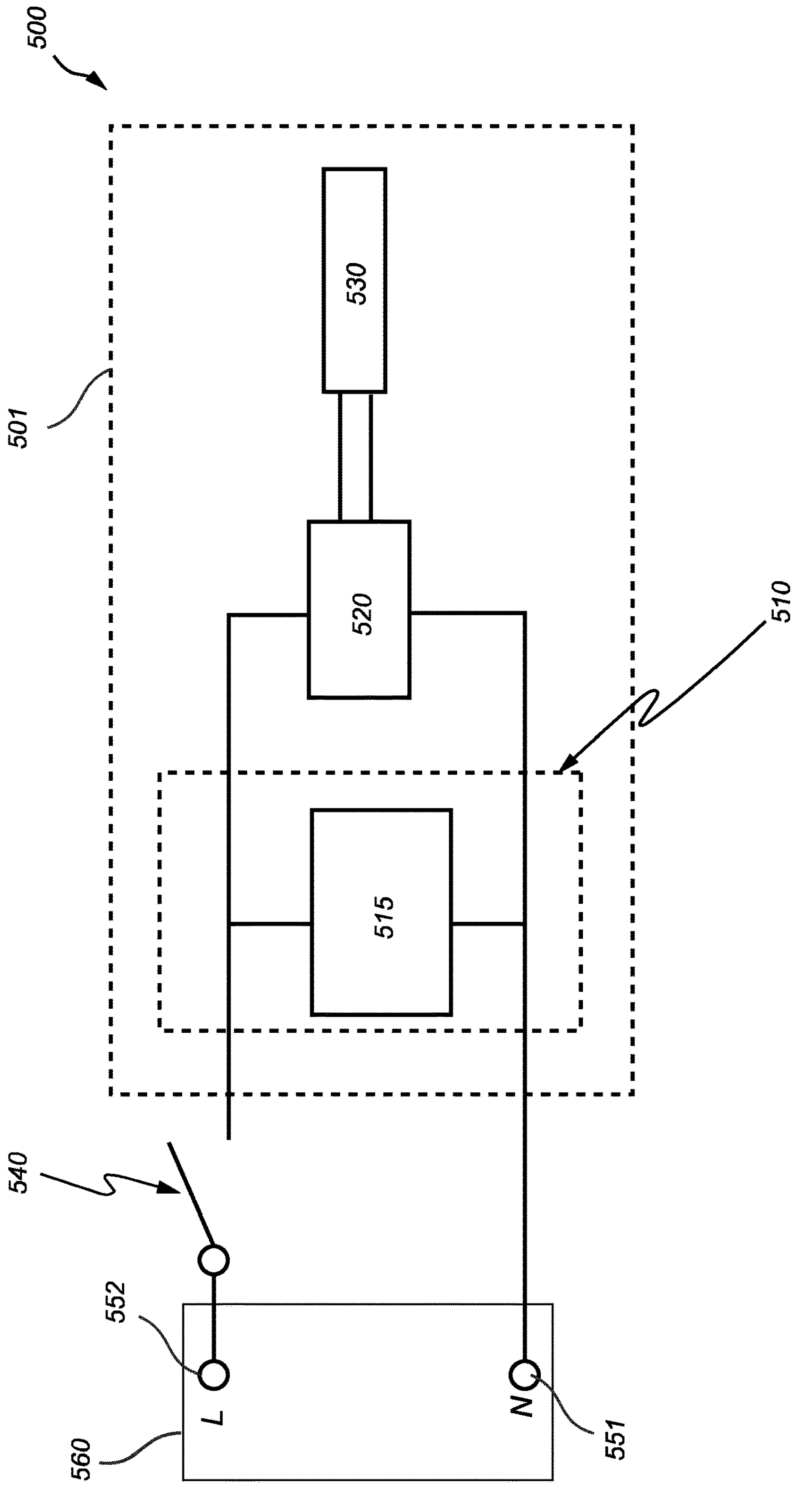

FIG. 5 schematically illustrates a block diagram 500 representing the electrical configuration of a luminaire or luminaire arrangement according to examples of the present invention. FIG. 5 further shows a mains voltage 560 which load 552 and neutral 551 are electrically connected in series with the drive unit 520 of the luminaire 501 via a switch 540 representing a wall interrupter of dimmer. FIG. 5 further illustrates a warning device 510 characterized similarly as the one illustrated in FIGS. 1-4. The warning device 510 is shown coupled in parallel between the mains voltage 560 and the drive unit 520 of the luminaire 501 and further comprises a drive module 515 also similarly characterized as the one illustrated in FIGS. 1-4. It is envisioned that the warning device 510 may also be coupled in series with the mains voltage 560 and the drive unit 520 of the luminaire 501. FIG. 5 depicts at least one light element 530 of the luminaire 501 coupled in series to the drive unit 520 and configured to generate and distribute light. It will be appreciated that the drive unit 520 of the luminaire 501 may also be controlled remotely via software implemented applications such that the light element 530 may be turned on or off or such that various lighting effect be achieved. The software-based control of the drive unit 520 may further be performed without interacting with the wall interrupter or dimmer 540 e.g. the light element 530 may be switched off while electrical current still remain in the luminaire 501 due to said wall interrupter 540 still being activated. The warning device 510 therefore warns the user of an electrically active luminaire by emitting a warning light signal upon opening of the lid of the warning device 510.

Figure 6:
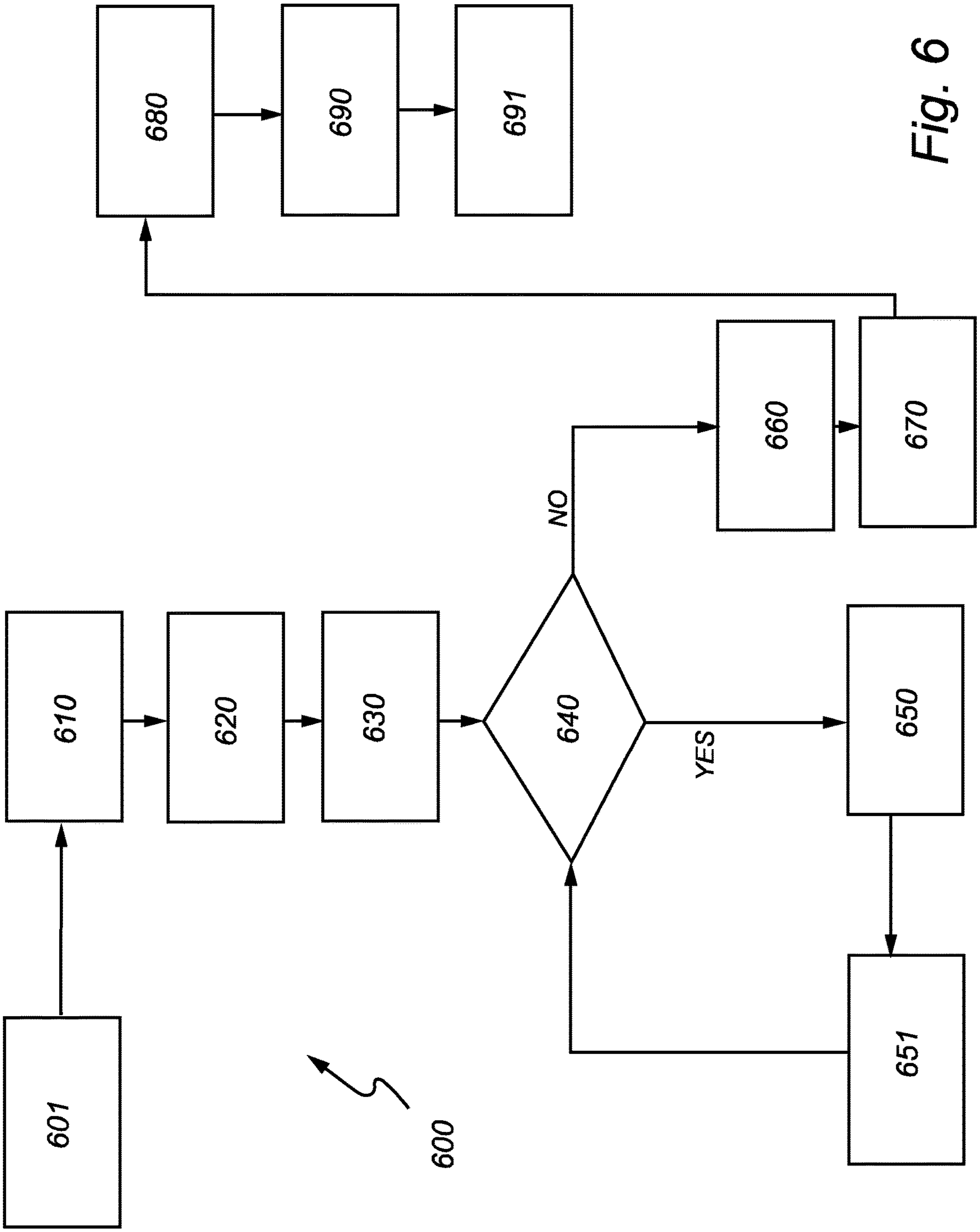

FIG. 6 schematically illustrates a block diagram 600 of the utilization process of the warning device by a user according to examples of the present invention. The block diagram of FIG. 6 is initiated 601 by a requirement to perform manipulation of the electrical wiring of the luminaire in order to e.g. replace/repair a light element, install more light elements, uninstall the luminaire, etc. The user must then proceed to opening 610 the lid of the warning device such that it reaches an open position releasing 620 the spring-loaded switch comprised on the drive module and accommodated in the housing of the warning device. The releasing 620 of the switch results in the enablement 630 of an electrical connection between the drive module of the warning device and the mains voltage representing the power supply of the luminaire or luminaire arrangement. FIG. 6 then illustrates a condition 640 for which if an electrical current supplied form the mains voltage is active in the drive module of the warning device, a warning light signal will be emitted 650 indicating to the user to verify all switches e.g. wall interrupters or dimmers of the luminaire to ensure that such switches are deactivated or turned off 651. Alternatively, if no electrical current is supplied to the drive module of the warning device the light source of the drive module will not emit a warning signal 660 as no electrical current reaches the light source. Consequently, the user may begin performing manipulation of electrical wiring 670 via the wire connectors of the electrical interface accommodated in the housing of the warning device. Upon completion of the manipulation of electrical wiring, the lid of the warning device may be transferred to a closed position 690 resulting in the compression and deactivation of the switch 690 therefore disabling the electrical current supplied to the light source of the drive module and preventing said light source from emitting any light signal 691.

The person skilled in the art realizes that the present invention by no means is limited to the preferred embodiments described above. On the contrary, many modifications and variations are possible within the scope of the appended claims. For example, the electrical configuration of the drive module may differ provide that the warning device fulfils its function of emitting a warning light signal upon a current of the mains voltage passing in the electrical interface.

The invention claimed is:

1. A warning device for use in a luminaire, the warning device comprising a housing accommodating a drive module arranged to be coupled to a luminaire and to a mains voltage, wherein the drive module comprises a light source coupled to a switch, and an electrical interface configured to electrically connect the drive module and the mains voltage to a light element of the luminaire, wherein the housing comprises a lid operably coupled to the switch of the drive module, wherein the lid is configured to activate the switch of the drive module upon an opening of the lid for switching on the light source upon a current of the mains voltage passing in the electrical interface, and deactivate the switch of the drive module upon a closing of the lid for switching off the light source.

2. The warning device according to claim 1, wherein the electrical interface comprises a plurality of wire connectors, wherein at least one wire connector of the plurality of wire connectors is configured to electrically connect the mains voltage to the drive module.

3. The warning device according to claim 2, wherein at least one wire connector of the plurality of wire connectors is configured to electrically connect the mains voltage to the light element of the luminaire.

4. The warning device according to claim 1, wherein the switch and the plurality of wire connectors of the electrical interface are arranged to extend through the housing.

5. The warning device according to claim 1, wherein the lid in a closed position is arranged to cover the housing.

6. The warning device according to claim 5, wherein the lid in the closed position is further configured to insulate the switch and the plurality of wire connectors of the electrical interface from the surrounding environment.

7. The warning device according to claim 1, wherein the switch is a spring-loaded switch comprising at least one spring element, wherein the spring-loaded switch is configured to be deactivated upon compression of the at least one spring element and to be activated upon release of the at least one spring element.

8. The warning device according to claim 7, wherein the switch is a normally open switch.

9. The warning device according to claim 7, wherein the switch is a normally closed switch.

10. The warning device according to claim 1, wherein the light source comprises at least one light-emitting diode, LED.

11. The warning device according to claim 1, wherein at least one of the housing and the lid is made of a transparent material.

12. A luminaire, comprising:

at least one light element, a luminaire drive unit electrically coupled to the at least one light element, and a warning device according to claim 1, the warning device being coupled to the luminaire drive unit, wherein the warning device is configured to emit a warning light signal indicating to a user an electrical current in the luminaire upon an opening of the lid of the warning device.

13. A luminaire arrangement, comprising:

a luminaire according to claim 12, a mains voltage for supplying power to the at least one light element of the luminaire.

* * * * *